US009008237B2

(12) United States Patent
Eder et al.

(10) Patent No.: US 9,008,237 B2
(45) Date of Patent: Apr. 14, 2015

(54) METHOD AND DEVICE FOR SYMBOL DETECTION

(71) Applicants: Franz Eder, Burgthann (DE); Tobias Kurpjuhn, Groebenzell (DE); Ernst Martin Witte, Taufkirchen (DE)

(72) Inventors: Franz Eder, Burgthann (DE); Tobias Kurpjuhn, Groebenzell (DE); Ernst Martin Witte, Taufkirchen (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 13/929,306

(22) Filed: Jun. 27, 2013

(65) Prior Publication Data
US 2015/0003262 A1 Jan. 1, 2015

(51) Int. Cl.
*H04L 27/06* (2006.01)
*H04B 7/04* (2006.01)
*H04B 17/00* (2006.01)

(52) U.S. Cl.
CPC .......... *H04B 7/0452* (2013.01); *H04B 17/0077* (2013.01)

(58) Field of Classification Search
CPC . H04L 1/005; H04L 25/03171; H04L 1/0048; H04L 25/067; H04L 2025/03426; H04L 25/03331; H04L 1/0054; H04L 25/03305; H03M 13/2957; H03M 13/1111; H03M 13/25; H03M 13/4138; H04B 7/0452; H04B 17/0077
USPC ......... 375/226, 299, 260, 267, 341, 224, 316, 375/347; 714/786, 794
See application file for complete search history.

(56) References Cited

U.S. PATENT DOCUMENTS

| 8,358,685 B2 * | 1/2013 | Siti et al. | 375/233 |
| 2012/0257692 A1 * | 10/2012 | Yeung et al. | 375/320 |

OTHER PUBLICATIONS

C. Studer, H. Bolcskei, "Soft-Input Soft-Output Single Tree Search Sphere Decoding". IEEE Transactions on Information Theory, vol. 56 No. 10, pp. 4827-4842, Oct. 2010.
F. Borlenghi et al., "A 2.78 mm2 65nm CMOS Gigabit MIMO Iterative Detection and Decoding Receiver". Proceedings of the European Solid-State Circuits Conference (ESSCIRC), pp. 65-68 Sep. 2012.
B. Hochwald, S. Ten Brink, "Achieving Near-Capacity on a Multiple-Antenna Channel". IEEE Transactions on Communications, vol. 51, No. 3, pp. 389-399, Mar. 2003.
C. Studer, S. Fateh, D. Seethaler, "A 757 Mb/s 1.5mm2 90 nm CMOS Soft-Input Soft-Output MIMO Detector for IEEE 802.11n". IEEE Proceedings of the European Solid-State Circuits Conference, pp. 530-533, Sep. 2010.
C. Studer, S. Fateh, D. Seethaler, "ASIC Implementation of Soft-Input Soft-Output MIMO Detection Using MMSE Parallel Interference Cancellation", IEEE Journal of Solid-State Circuits, vol. 46, No. 7, pp. 1754-1765, Jul. 2011.
E. M. Witte et al., "a Scalable VLSI Architecture for Soft-Input Soft-Output Single Tree Search Sphere Decoding". IEEE Transactions on Circuits and Systems 11: Express Briefs, vol. 57, No. 9, pp. 706-710, Sep. 2010.
C.H. Liao et al., "Combining Orthogonalized Partial Metrics: Efficient Enumeration for Soft-Input Sphere Decoder". Proceedings of the IEEE International Symposium on Personal, Indoor and Mobile Radio Communications, pp. 1287-1291, Sep. 2009.
B. Wu, G. Masera, "Efficient VLSI Implementation of Soft-Input Soft-Output Fixed-Complexity Sphere Decoder". IET Communications, vol. 6, No. 9, pp. 1111-1118, Jun. 2012.

* cited by examiner

*Primary Examiner* — Dhaval Patel
(74) *Attorney, Agent, or Firm* — Schiff Hardin LLP

(57) ABSTRACT

A method for symbol detection includes assigning a received symbol to at least one particular candidate symbol of a set of candidate symbols of a finite candidate symbol alphabet based on a metric between the received symbol and the at least one particular candidate symbol, the metric comprising contributions with respect to channel-based information and contributions with respect to a priori information.

18 Claims, 7 Drawing Sheets

METHOD AND DEVICE FOR SYMBOL DETECTION

FIELD

The disclosure relates to a method and a device for symbol detection and to a device including a soft-input soft-output MIMO detector and a source for a priori information, such as a soft-input soft-output channel decoder.

BACKGROUND

Multi-antenna transmission also referred to by multiple-input multiple-output (MIMO) promises significant improvements of the spectral efficiency achieved over a wireless link. However, this improvement comes at the cost of a receiver complexity which puts major challenges on the computational resources currently available on mobile wireless receiver implementations. These challenges become particularly critical for receivers applying iterative detection and decoding (IDD) as receiver technology for reducing error rates and further improving the throughput and the spectral efficiency.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
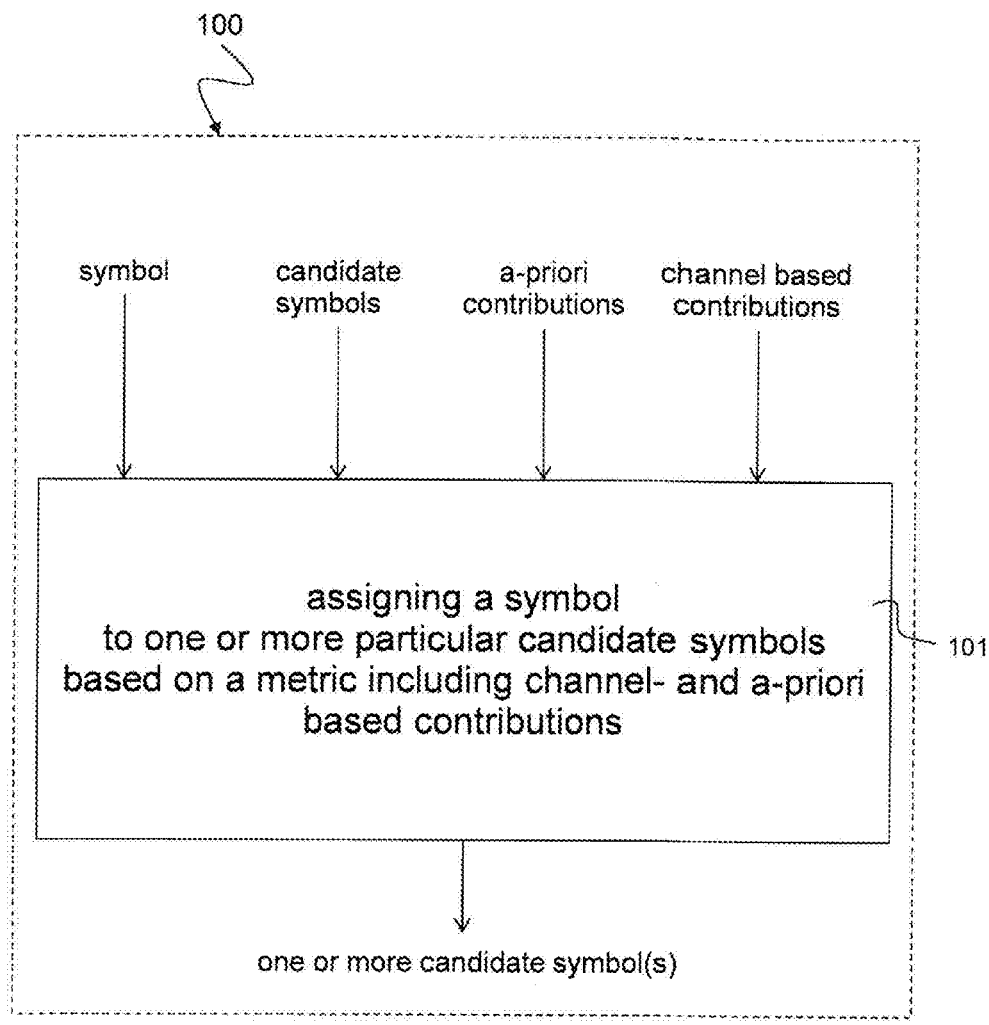
FIG. 1 is a schematic diagram of a method 100 in accordance with the disclosure for symbol detection.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The following terms, abbreviations and notations will be used herein:

MIMO: Multiple-Input Multiple-Output.
SISO: Soft-Input Soft-Output.
FLLE: Fast Leaf-Level Enumeration.
MMSE: Minimum Mean-Squared Error.
PIC: Parallel Interference Cancellation.
LTE: Long Term Evolution.
UE: User Equipment.
QPSK: Quadrature Phase Shift Keying.
QAM: Quadrature Amplitude Modulation.
I: In-phase
Q: Quadrature phase
IDD: Iterative Detection and Decoding.
MAP: Maximum A Posteriori.
LLR: log-likelihood ratio.
QR: a QR decomposition (also called a QR factorization) of a matrix is a decomposition of a matrix A into a product A=QR of an unitary matrix Q and an upper triangular matrix R.
STS: Single Tree Search.
BLER: Block Error Rate.
HARQ Hybrid automatic repeat request is a combination of high-rate forward error-correcting coding and ARQ error-control. In standard ARQ, redundant bits are added to data to be transmitted using an error-detecting code such as a cyclic redundancy check (CRC).
Alphabet: an alphabet is a non-empty set of symbols or letters, e.g. characters or digits.
Metric: a metric or distance function is a function that defines a distance between elements of a set.
Euclidean
Metric: a Euclidean distance between points p and q is the length of the line segment connecting them.
Norm: a norm is a function that assigns a strictly positive length or size to each vector in a vector space.
$L^p$ norm:

$$\|x\|_p := \left( \sum_{i=1}^{n} |x_i|^p \right)^{1/p}.$$

Manhattan
norm: $L^p$ norm with p=1.
Euclidean
norm: $L^p$ norm with p=2.
infinity
norm: $L^p$ norm with p approaching infinity.
𝔹:=(−1,1): the set of bipolar bits. 1 corresponds to the unipolar zero-bit, and −1 corresponds to the unipolar one-bit.
ℂ: the field of complex numbers.

$$\mathbb{I} := \left\{ (l, n) \,\middle|\, \begin{array}{l} n \in \{0, \ldots, N-1\}, \\ l \in \{0, \ldots, |\mathbb{S}_n|-1\} \end{array} \right\},$$

$$\mathcal{N} \in \mathbb{Z}_+$$

the set of indices for indexing a bit in a modulation symbol vector.
ℕ: the set of natural numbers 0, 1, 2, . . .
ℚ: the field of rational numbers.
ℝ: the field of real numbers.
𝕊_n, n ∈ {0, . . . , N−1}:

Modulation symbol alphabet for stream n.

$\mathbb{S} = \mathbb{S}_0 \times \ldots \times \mathbb{S}_{N-1}$, $N \in \mathbb{Z}_+$:

Modulation symbol vector alphabet with N streams.

$\mathbb{Z}$: the Euclidean ring of integers.

$\mathbb{Z}_+ := [l \in \mathbb{Z} | i < 0]$:

The set of positive integers.

$\|\cdot\|_2 : \mathbb{C}^N \to \mathbb{R}, N \in \mathbb{Z}_+$:

Euclidean norm operator. $\|\cdot\|_2 : x \mapsto \|x\|_2 := \sqrt{\sum_{n \in N} |x_n|^2} = x^H x$.

The methods and devices described herein may be designated as "soft-input soft-output (SISO) Fast Leaf-Level Enumeration (FLLE)" within this description, opposed to the well-known non-SISO FLLE, which is non-applicable any more in the case of IDD systems.

The methods and devices described herein may be based on different metrics. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on an LTE and/or OFDM standard. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, discrete circuits, partially integrated circuits or fully integrated circuits or programming means, optical circuits, memory circuits and/or integrated passives. The described methods and devices may be implemented in hardware or in software.

The methods and devices described herein after may be designed to be compliant with mobile standards such as e.g. the Long Term Evolution (LTE) standard. LTE, marketed as 4G LTE, is a standard for wireless communication of high-speed data for mobile phones and data terminals. It follows the GSM/EDGE and UMTS/HSPA network technologies, increasing the capacity and speed using a different radio interface together with core network improvements.

The methods and devices described herein may be implemented in Multiple-Input Multiple-Output (MIMO) wireless communication systems. MIMO wireless communication systems may employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. A MIMO detector may be used for detecting the MIMO channel which may be described by the channel matrices between respective antennas of the transmitter and respective antennas of the receiver.

The methods and devices described herein may be implemented in a MIMO system according to the MIMO system model as described in the following. M, N are positive integers, where N denotes the number of spatial streams, and M denotes the number of receiver antennas. $\mathbb{S}_n$ denotes the modulation symbol alphabet used on spatial stream $n \in N$. $\mathbb{S}_n$ can be QPSK or a QAM modulation scheme for example. $|\mathbb{S}_n|$ denotes the modulation order and thus the number of different modulation symbols, e.g. 64 for a 64-QAM modulation. $\mathbb{S} := \mathbb{S}_0 \times \ldots \times \mathbb{S}_{N-1} \subseteq \mathbb{C}^N$ denotes the modulation symbol alphabet. s is an $\mathbb{S}$-valued random variable that models the transmitted modulation symbol to be detected. $H \in \mathbb{C}^{M \times N}$ is referred to as the channel matrix. z denotes the $\mathbb{C}^M$-valued, strictly circular symmetric, thus $E(z)=0_M$, normally distributed random variable modeling the interference plus noise with the M×M identity $\Phi_z = E(zz^H) = I_M$ as covariance matrix, which can be ensured by noise whitening. y is referred to as the $\mathbb{C}^M$-valued random variable that models the received signal vector:

$$y := Hs + z. \quad (1)$$

In the examples herein, the mapping of bipolar bits $b_{l,n} \in \mathbb{B}$ with stream index n and stream-wise bit index $0 \leq l \leq L_n - 1$ with $L_n = \log_2 |\mathbb{S}_n|$ and $(l,n) \in \mathbb{J}$ is used. The mapping between the bit vector b with elements $b_{l,n}$ and the symbol s is defined by the mapping function $s = \mu(b)$.

The methods and devices described herein may be implemented in an iterative detection and decoding MIMO receiver as described in the following. By iterating between MIMO detection and channel decoding (iterative detection and decoding, IDD), a near-capacity throughput on a MIMO channel can be achieved. Such a system requires a soft-input soft-output (SISO) MIMO detector. The SISO MIMO detector takes into account so called a priori information at its input. The a priori information is fed back from the channel decoder and additionally used to compute soft-output (typically extrinsic) information at the output of the detector. The soft-output information is then fed forward to the channel decoder. The exchanged information between detector and decoder is represented as sequence of bit-wise log-likelihood ratio (LLR) values. For a stream n and the stream-wise bit index l, with $(l,n) \in \mathbb{J}$, $L^D_{l,n}$ represents the a posteriori LLR for bit $b_{l,n}$ at the detector output. Similarly, $L^A_{l,n}$ is the a priori LLR and $L^E_{l,n} = L^D_{l,n} - L^A_{l,n}$ the extrinsic LLR respectively. A posteriori and/or extrinsic LLRs may provide e.g. max-log MAP quality, log-MAP quality or any approximation thereof.

The methods and devices described herein may be implemented in SISO MIMO detection systems as described in the following. The max-log MAP detection problem and thus the computation of an extrinsic LLR $L^E_{l,n}$ for bit l on stream n can be formulated for the SISO case by the following exemplary equation:

$$L^E_{l,n} = \min_{s \in \mathbb{S}_{l,n}(-1)} \{\|y - Hs\|^2_2 - \log Pr(s)\} - \min_{s \in \mathbb{S}_{l,n}(+1)} \{\|y - Hs\|^2_2 - \log Pr(s)\} - L^A_{l,n} \quad (2)$$

with $\mathbb{S}_{l,n}(b) = \{s | s = \mu^{-1}(b) \hat{} b_{l,n} = b\}$ and Pr(s) being the a priori symbol probability derived for a transmit vector s from all priori LLRs $L^A_{l,n}$. Depending on scenario, purpose and complexity optimization targets, variants of this equation are possible, e.g. using different norms like the 1-norm $\|\cdot\|_1$ or the infinity norm $\|\cdot\|_\infty$ instead of the Euclidean norm $\|\cdot\|_2$.

The methods and devices described herein may be implemented in MIMO detection algorithms such as tree-search approaches, typically called sphere decoders as described in the following. A tree search becomes possible by applying a QR decomposition (QRD) to the channel matrix H or any variant, such as sorted QRDs, MMSE-QRD, Tikhonov regularized QR, etc. Such a decomposition yields a unitary matrix Q and an upper triangular matrix $\check{R}$ such that the system equation (1) is transformed to:

$$\check{y} = \check{R}s + \check{z} \qquad (3)$$

with $\check{y} := Q^H y \in \mathbb{C}^N$ and $\check{z} := Q^H z \in \mathbb{C}^N$.

The methods and devices described herein may also be implemented in alternative SISO MIMO detection solutions which do not apply tree searches, for example implementing a Markov Chain Monte Carlo (MCMC) algorithm or an MMSE-PIC (Minimum Mean-Squared Error based Parallel Interference Cancellation) architecture as described below.

The methods and devices described herein may be based on different metrics, e.g. based on tree search metrics as described in the following. The transformation in (3) enables tree searches with N tree levels. Each tree level corresponds to a spatial stream, except the tree root. The spatial stream n=0 refers to tree leaves while the spatial stream n=N−1 refers to the children of the tree root. With $L_n$ bits per symbol on the spatial stream n, the asymptotic worst-case complexity is given by $$O\left( 2 \sum_{n=0}^{N-1} L_n \right).$$

This prohibitive worst-case complexity is typically reduced to acceptable average complexities by various tree-pruning variants (known as branch & bound from computer science). Tree-traversal variants and pruning variants lead to the existing large field of sphere-decoding algorithms. Every path from the tree root to a node $s_n$ on level n is a partial path $s_{[\geq n]} \in \mathbb{C}^{N-n}$, $s_{[\geq n]} = [s_n, \ldots, s_{N-1}]^T$. For each branch from a parent node $s_{n+1}$ towards a node $s_n$ a branch metric $e^{(n)}(s_n | s_{[\geq n+1]})$ can be defined. In case Euclidean norms are used such a branch metric is given by:

$$e^{(n)}(s_n | s_{[\geq n+1]}) = |\tilde{y}_n(s_{[\geq n+1]}) - R_{n,n} s_n|^2 - \log Pr(s_n) \qquad (4)$$

With $$\tilde{y}_n(s_{[\geq n+1]}) = \check{y}_n - \sum_{k=n+1}^{N-1} R_{n,k} s_k. \qquad (5)$$

the sum of all branch metrics along a partial path $s_{[\geq n]}$ is a partial path metric $$d^{(n)} = \sum_{k=n}^{N-1} e^{(k)}(s_k | s_{[\geq k+1]}). \qquad (6)$$

For simplification, $d(s) := d^{(0)}(s)$ is used for the metric of a full path from the tree root to a leaf. In case other norms are used, the operators $|\cdot|^2$ and $\Sigma_{k=n}^{N-1} e^{(k)}$ (4) and (6) need to be replaced by the suitable alternatives. By introducing bit-specific metrics $\lambda_{l,n}(b)$ for a bipolar bit $b \in \mathbb{B}$ according to $$\lambda_{\ell,n}(b) := \min_{s \in \mathbb{S}_{\ell,n}(b)} d(s) \qquad (7)$$

Equation (2) can be written as $$L_{l,n}^E = \lambda_{l,n}(-1) - \lambda_{l,n}(+1) - L_{l,n}^A. \qquad (8)$$

Furthermore, an approximation of $-\log Pr(s_n)$ described in "C. Studer and H. Bölcskei: Soft-Input Soft-Output Single Tree-Search Sphere Decoding in IEEE Transactions on information theory, Jun. 4, 2009" for statistically independent symbols $s_n$ which still provides max-log MAP optimum LLRs is given by:

$$-\log Pr(s_n) \cong \sum_{\ell=1}^{L_n-1} \begin{cases} 0, & b_{\ell,n} L_{\ell,n}^A > 0 \\ |L_{\ell,n}^A|, & \text{otherwise} \end{cases}. \qquad (9)$$

This approximation will be used in the examples for the SISO Fast Leaf-Level Enumeration within this document, though the SISO Fast Leaf-Level Enumeration is not limited to this specific realization of $-\log Pr(s_n)$. An alternative realization of the a priori metric contributions is given below in the example of the MMSE-PIC detector.

The methods and devices described herein may be implemented in soft-output computation algorithms such as max-log MAP output LLRs computation or Single Tree-Search (STS) algorithms, as described in the following. Although Single Tree Search (STS) may be directly linked with a depth-first tree search according to "C. Studer and H. Bölcskei: Soft-Input Soft-Output Single Tree-Search Sphere Decoding in IEEE Transactions on information theory, Jun. 4, 2009", only the principle of soft-output LLR generation is adopted exemplarily in this description for explanation purpose of the Fast Leaf-Level SISO Enumeration, independently from the tree traversal strategy. The Single Tree-Search (STS) algorithm computes all metrics required for the output LLRs in a single tree search. On the one hand, it detects the maximum a posteriori (MAP) solution $s^{MAP}$ and its bipolar bit mapping $b^{MAP} = \mu^{-1}(s^{MAP})$ with $$\lambda^{MAP} = d(s^{MAP}) = \min_{s \in \mathbb{S}} d(s). \qquad (10)$$

In the following, $s^{MAP}$ is also called the hypothesis. On the other hand, bit-wise counter-hypothesis metrics $\lambda^c_{l,n}$ can be determined by $$\lambda_{l,n}^c := \lambda_{l,n}(-b_{l,n}^{MAP}). \qquad (11)$$

The so called extrinsic counter-hypothesis (candidate) metrics used in "C. Studer and H. Bölcskei: Soft-Input Soft-Output Single Tree-Search Sphere Decoding in IEEE Transactions on information theory, Jun. 4, 2009" for simplified notation of LLR clipping are omitted in this description for a cleaner presentation of the Fast Leaf-Level SISO Enumeration. Those concepts can be applied on top of the concept introduced in this description.

With these exemplary definitions of hypothesis metric and counter-hypothesis metrics, max-log MAP approximated a posteriori LLRs can be computed by $$L_{l,n}^D = b_{l,n}^{MAP} \cdot (\lambda_{l,n}^c - \lambda^{MAP}). \qquad (12)$$

The methods and devices described herein may be implemented using metrics for partial and full paths for hypothesis and counter-hypothesis candidates. Heuristics referred to as "tree pruning" can be realized which allow to ignore irrelevant parts of the search tree. In typical pruning approaches, irrelevant paths are those which do not (or unlikely, depending on the pruning strategy) lead to any of the hypothesis or counter-hypothesis candidates. The methods and devices described herein may be implemented jointly with exemplary pruning strategies as described for instance in "C. Studer and H. Bölcskei: Soft-Input Soft-Output Single Tree-Search Sphere Decoding in IEEE Transactions on information theory, Jun. 4, 2009". Tree pruning requires a so-called "enumeration" which is a term for determining a search order (e.g. for depth-first search, best-first search, etc.) and/or a (sequential or parallel) selection (e.g. breadth-first search, fixed-complexity SD, etc.) of child nodes. Commonly, the term "Schnorr-Euchner Enumeration" refers to the perfect ascending order of $e^{(n)}(s_n|s_{[\geq n+1]})$ among all $s_n \in \mathbb{S}_n$ for a certain partial path $s_{[\geq n+1]}$ a parent node $s_{n+1}$.

The methods and devices described herein may be implemented in MMSE-PIC decoders as described in the following. Aside from tree-search approaches, many other MIMO demapping algorithms exist which have to solve similar minimization problems within the one-dimensional or multi-dimensional signal space. One example for such alternative algorithms is the SISO MIMO detector presented in "C. Studer, S. Fateh and D. Seethaler: A 757 Mb/s 1.5 mm 90 nm CMOS Soft-Input Soft-Output MIMO Detector for IEEE 802.11n, in IEEE Proceedings of the European Solid States Circuits Conference, pp. 530-533, September 2010" and in "C. Studer, S. Fateh, D. Seethaler: ASIC Implementation of Soft-Input Soft-Output MIMO Detection Using MMSE Parallel Interference Cancellation, in IEEE Journal of Solid-State Circuits, vol. 46, no. 7, pp. 1754-1765, July 2011" which is based on the MMSE MIMO detection principle. Nevertheless, this approach has to solve a sub-problem which is basically the one-dimensional equivalent of (2). Therefore, the MMSE-PIC is well suitable to demonstrate the use of the SISO FLLE approach according to methods and devices described in this document beyond the scope of sphere-decoding algorithms. The MMSE-PIC algorithm has to solve the minimum search $$L_{\ell,n}^E = \min_{s_n \in \mathbb{S}_\ell^{(n)}(-1)} \left\{ \rho_n |z_n - s_n|^2 - \sum_{\ell=0}^{L_n-1} \frac{2b_{\ell,n}-1}{2} L_{\ell,n}^A \right\} - \min_{s \in \mathbb{S}_\ell^{(n)}(+1)} \left\{ \rho_n |z_n - s_n|^2 - \sum_{\ell=0}^{L_n-1} \frac{2b_{\ell,n}-1}{2} L_{\ell,n}^A \right\} - L_{\ell,n}^A \quad (13)$$

With the single-stream bit-wise candidate sets $\mathbb{S}_l^{(n)}(b) = \{s_n | s_n \in \mathbb{S}_n, b_{*,n} = \mu^{-1}(s_n), b_{l,n} = b\}$ and $\rho_n \in \mathbb{R}$ as well as $z_n \in \mathbb{C}$ defined according to "C. Studer, S. Fateh and D. Seethaler: A 757 Mb/s 1.5 mm 90 nm CMOS Soft-Input Soft-Output MIMO Detector for IEEE 802.11n, in IEEE Proceedings of the European Solid States Circuits Conference, pp. 530-533, September 2010", equation (14). The architecture published in those documents, however in contrast to the methods and devices described in this document, omits a priori information in the one-dimensional minimum search in (13) in order to apply non-SISO optimizations for this minimum search and in order to benefit from a complexity reduction similar to that achievable by a non-SISO FLLE, but at the cost of a BLER performance degradation for higher modulation orders. Methods and devices described in this document enable also the MMSE PIC architecture as described in "C. Studer, S. Fateh, D. Seethaler: ASIC Implementation of Soft-Input Soft-Output MIMO Detection Using MMSE Parallel Interference Cancellation, in IEEE Journal of Solid-State Circuits, vol. 46, no. 7, pp. 1754-1765, July 2011" to fully consider the a-priori terms in its processing steps and therefore avoid BLER performance degradations in case of higher modulation orders.

The methods and devices described herein may be implemented in Fast Leaf-Level Enumeration approaches as described in the following. The MIMO detection problem has a complexity exponentially increasing with the number of spatial streams. Therefore, the reduction of the search space by one dimension can yield significant complexity reductions by an order of magnitude, more precisely by the size of the corresponding modulation alphabet. Such a complexity reduction is achieved by an approach named fast leaf-level enumeration (FLLE) within this description. Such an approach effectively eliminates one (complex valued) dimension of the search space, for instance the search on the leaf level of the search tree or the one-dimensional search in soft-output MMSE detectors. It can be realized particularly efficient in case the bit-to-symbol mapping is orthogonal with respect to the in-phase (I) and quadrature phase (Q) symbol and bit vector components, as for instance given in LTE or Gray mappings. Although this principle applied in the context of a tree search in the examples given in this document, it is equivalently useful in detectors which do not apply a tree search. Examples for such alternative decoders are approaches which reduce the N-dimensional search problem to multiple (less optimum) one-dimensional sub-problems, as for instance in the case of the MMSE-PIC algorithm described above.

Figure 2:
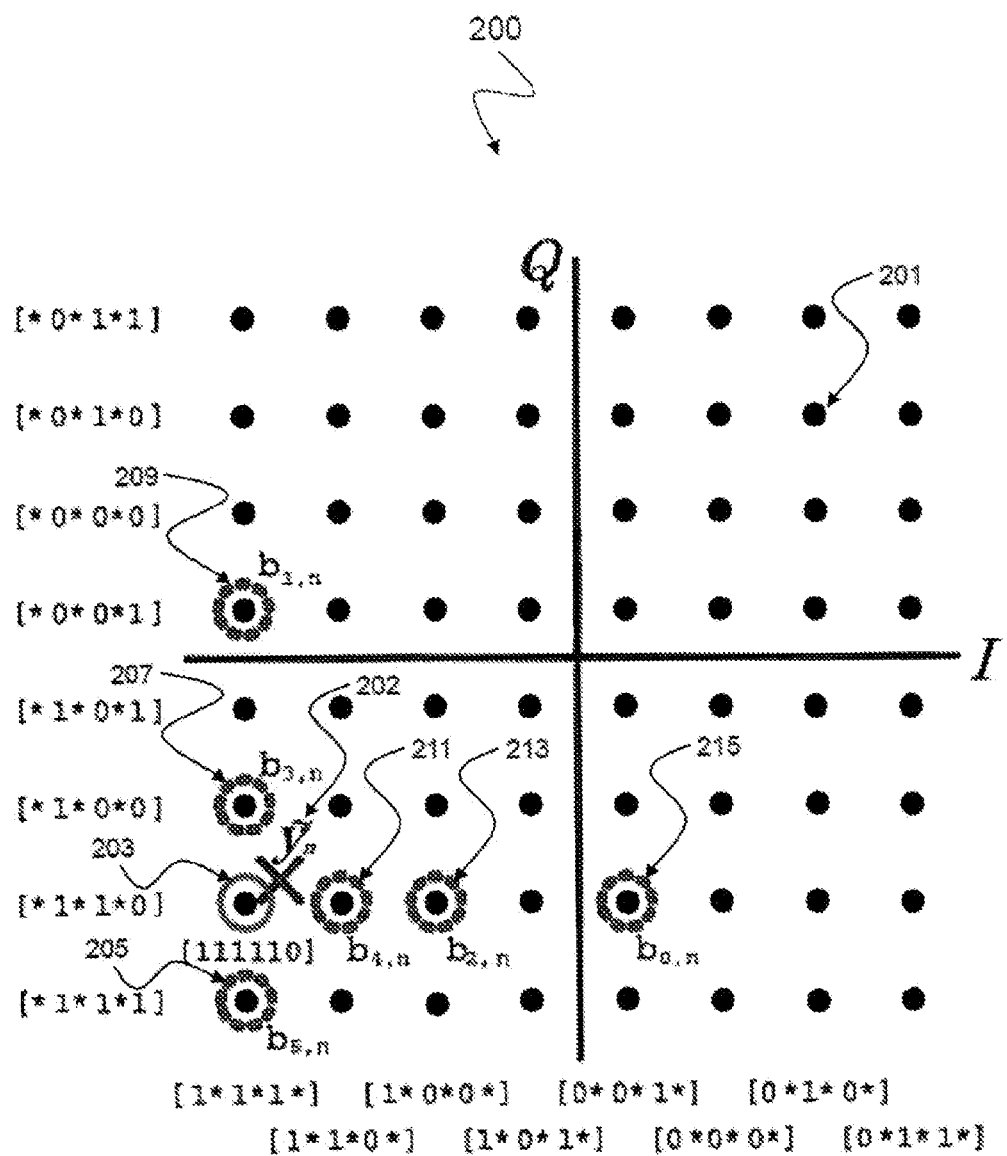
FIG. 2 is a schematic diagram of a 64-QAM symbol modulation alphabet 200 in accordance with the disclosure used for providing a set of candidate symbols in a method 100 for symbol detection.

The methods and devices described herein may be implemented in order to improve a non-SISO FLLE by soft-input support. An FLLE approach without SISO support is described in the following. An FLLE for non-SISO MIMO detectors can be realized by almost hard wired (geometrical) search decisions plus the computation of the $L_n+1$ (counter-) hypothesis candidates assuming $L_n$ bits mapped to symbols (on the leaf level for n=0). Therefore, no search or classical enumeration is required in order to fully process the respective dimension of the search space. An exemplary modulation alphabet and the corresponding bit-to-symbol mapping are depicted in FIG. 2 for a $\tilde{y}_n$ computed according to equation (5). Each of these 64 constellation points is a candidate symbol $s_n$. In case of the leaf-level processing in a tree search (n=0) $s_n$ is expanded by its path to the tree root to a full candidate symbol s. In this context, FIG. 2 is used for intuitively visualizing a metric including only channel based contributions as described below. For example, the hypothesis candidate $(b_{*,0}^{best}=[111110])$ and all six counter-hypothesis candidates illustrated by the dashed circles that can be generated for this exemplary leaf level. Instead of enumerating (computing+sorting) for instance Euclidean distances of all 64 candidate nodes, the candidate selection can be purely based on geometrical relations between $\tilde{y}_n$, the constellation symbols and the fixed I/Q-orthogonal mapping. Therefore, without a priori information and for a fixed I/Q-orthogonal mapping, the min(.) terms in equations (7), (10) and (11) can be solved separately per I and Q dimension of the signal space and are furthermore constant for the $L_n/2$ nearest-neighbor intervals in each I or Q dimension of the complex plane. Therefore, very few single-bit checks are sufficient in order to determine all $L_n$ counter-hypothesis candidates. Neither metric computations nor compare-select structures are required for the decision. Such pure geometric decisions are not possible any more in case a priori information needs to be considered, e.g. as given in equations (2) and (4). As the techniques described in this document use metrics applying a priori contributions such techniques provide a significant improvement over FLLE without SISO support (e.g. error rate reduction, throughput increase) or SISO detectors without FLLE (e.g. complexity reduction).

The methods and devices described herein may be implemented in order to improve non-SISO MIMO detection methods to adequately support a priori information as described in the following. In non-SISO MIMO detection, many efficient approaches are known exploiting geometrical properties of the constellation diagram in order to significantly reduce the search complexity. However, a priori information in IDD systems changes the metrics used for ordering. Therefore, those established non-SISO enumeration schemes (including non-SISO FLLE) cannot be reused with a priori information, neither to determine the hypothesis nor the counter hypothesis candidates, without either algorithmic performance degradation or a significant increase of tree-search complexity. As techniques described in this document use a new approach to process channel-based and a priori metric contributions such techniques provide significant improvements (e.g. lower complexity, better error rates, higher throughput) over non-SISO MIMO detection and SISO MIMO detection without SISO FLLE.

The methods and devices described herein may be implemented in order to improve FLLE by soft-input support as described in the following. In all following equations, the tree-search demapping approach as introduced above with respect to equations (2) to (13) is used to explain the application of the SISO FLLE concept. Metrics presented in the following refer to branch metrics in the tree search and thus to a single spatial layer. Further metric contributions to obtain full partial path metrics are omitted for clarity. Also for clarity, the simplified notation $e^{(n)}(s_n)$ will be used in the following equivalently to $e^{(n)}(s_n|s_{[\geq N+1]})$.

FIG. 1 is a schematic diagram of a method 100 in accordance with the disclosure for symbol detection. The figure illustrates a method 100 for improving FLLE by soft-input support. The method 100 may include assigning 101 a received symbol to at least one particular candidate symbol of a set of candidate symbols of a finite candidate symbol alphabet. The assignment is based on a metric between the received symbol and at least one particular candidate symbol. The metrics comprise contributions with respect to channel-based information and contributions with respect to a priori information. This is in accordance with a complexity reduction with respect to a complexity of the brute force solution described below, e.g. a complexity reduction by at least one dimension. The symbol may comprise a symbol vector or a scalar symbol.

A received symbol $\tilde{y}_n$ and candidate symbols of a finite candidate symbol alphabet are described below with respect to FIG. 2. An application of the method 100 in a device 400 for symbol detection and in a MIMO detector of an IDD (iterative detection and decoding) system is described below with respect to FIGS. 4, 5, and 6. A search tree applying the method 100 is described below with respect to FIG. 7. A metric between a received symbol and a candidate symbol is described in the following and is further described below with respect to FIG. 3. The complexity reduction that can be achieved by applying such assigning 101 as described below with respect to FIGS. 4 and 5.

A brute-force solution to the leaf-level enumeration with SISO support would require the following: Finding the best solution $e_{best}^{(n)}$ on the spatial layer n by computing all $2^{L_n}$ metrics $e^{(n)}(s_n)$, and finding the minimum $e_{best}^{(n)}$, its argument $s_n^{best}$ as well its mapping $b_{*,n}^{best} = \mu^{-1}(s_n^{best})$ among those $2^{L_n}$ metrics by $$e_{best}^{(n)}(s_n^{best}) = \min_{s_n \in \mathbb{S}_n} e^{(n)}(s_n), \quad (14)$$

and finding for each of the $L_n$ bits $b_{l,n}$ the corresponding counter-hypothesis candidate $s^c_{l,n}$ and its branch metric $e^{(n)}(s^c_{l,n})$ for $s_n^{best}$ by: reusing the $2^{L_n}$ metrics $e^{(n)}(s_n)$ already computed for $e_{best}^{(n)}(s_n^{best})$, and running $L_n$ minimum searches over $2^{L_n-1}$ elements according to $$e^{(n)}(s^c_{l,n}) = \min_{s_n \in \mathbb{S}_{l,n}(-b_{l,n}^{best})} e^{(n)}(s_n). \quad (15)$$

In typical use cases this brute force solution leads to inacceptable complexity. The methods and devices described herein may be implemented in order to significantly reduce the computational complexity of the brute-force solution given by equations (14) and (15) as described in the following.

The principle to derive a significantly more efficient SISO FLLE solution is described in the following. For a sufficiently suitable symbol-to-bit mapping, the idea of defining metric contributions orthogonal in terms of in-phase (I) and quadrature phase (Q) can be exploited for efficient implementations. First, the contributions to the metric $e^{(n)}(s_n)$ are split into contributions $e_C^{(n)}(s_n)$ for the channel-based information, also named geometrical information from y and H (or equivalently $\tilde{y}$ and $\tilde{R}$) and metric contributions $e_A^{(n)}(s_n)$ based on a priori information that may be given by a priori LLRs $L^A_{l,n}$ for example:

$$e^{(n)}(s_n) = e_C^{(n)}(s_n) \boxplus e_A^{(n)}(s_n) \quad (16)$$

but may also be given by any other soft information. The operator $\boxplus$ refers to the operator suitable to merge channel-based and a priori based metric contributions. For example, this operator may be realized as an addition "+" in case metrics are computed according to equations (2) and (4).

Second, each of the metrics $e^{(n)}$, $e_C^{(n)}$ and $e_A^{(n)}$ are separated into contributions for the in-phase component, e.g. $e_{Re}^{(n)}$, and quadrature phase component, e.g. $e_{Im}^{(n)}$, of the symbol candidate $s_n = s_{n,Re} + js_{n,Im}$:

$$e^{(n)}(s_n) = e_{Re}^{(n)}(s_{n,Re}) \oplus e_{Im}^{(n)}(s_{n,Im})$$

$$e_{Re}^{(n)}(s_{n,Re}) = e_{C,Re}^{(n)}(s_{n,Re}) \boxplus e_{A,Re}^{(n)}(s_{n,Re})$$

$$e_{Im}^{(n)}(s_{n,Im}) = e_{C,Im}^{(n)}(s_{n,Im}) \boxplus e_{A,Im}^{(n)}(s_{n,Im}) \quad (17)$$

where the operator $\oplus$ refers to that operator suitable to merge in-phase and quadrature-phase metric contributions for the selected metrics, e.g. an addition "+" for the 2-norm (Euclidean norm) or a maximum detection "max" for the infinity norm. In an implementation, e.g. depending on the chosen operators $\boxplus$ and $\oplus$, the contributions $e_{C,Re}^{(n)}$, $e_{C,Im}^{(n)}$, $e_{A,Re}^{(n)}$ and $e_{A,Im}^{(n)}$ may be kept separate until the computation of the final hypothesis and counter-hypothesis candidates and their metrics.

For the example of the model and norms used in equation (2), the operator $\oplus$ can be defined as addition "+" and thus the components $e_{C,Re}^{(n)}$ and $e_{C,Im}^{(n)}$ can be computed by $$\delta_n = \tilde{y}_n - R_{n,n} s_n$$

$$e_C^{(n)}(s_n) = \|\delta_n\|_2^2 = e_{C,Re}^{(n)}(s_{n,Re}) + e_{C,Im}^{(n)}(s_{n,Im})$$

$$e_{C,Re}^{(n)}(s_{n,Re}) = \|Re[\delta_n]\|_2^2$$

$$e_{C,Im}^{(n)}(s_{n,Im}) = \|Im[\delta_n]\|_2^2. \quad (18)$$

For $e_A^{(n)}$ a very similar separation of the metric contributions can be achieved. In the following example, this principle is applied for the simplified computation of $-\log Pr(s_n)$ as given in (9) with the exemplary I/Q-orthogonal bit mappings $s_{n,Re} = \mu_{Re}(b_{*,n,Re})$ and $s_{n,Im} = \mu_{Im}(b_{*,n,Im})$ with $b_{*,n,Re} = [b_{0,n}, b_{2,n}, \ldots, b_{Ln-2,n}]$ and $b_{*,n,Im} = [b_{1,n}, b_{3,n}, \ldots, b_{Ln-1,n}]$:

$$e_A^{(n)}(s_n) = -\log Pr(s_n) = e_{A,Re}^{(n)}(s_{n,Re}) + e_{A,Im}^{(n)}(s_{n,Im}) \quad (19)$$

$$e_{A,Re}^{(n)}(s_{n,Re}) = \sum_{k=0}^{L_n/2-1} \begin{cases} 0, & b_{2k,n} L_{2k,n}^A > 0 \\ |L_{2k,n}^A|, & \text{otherwise} \end{cases}$$

$$e_{A,Im}^{(n)}(s_{n,Im}) = \sum_{k=0}^{L_n/2-1} \begin{cases} 0, & b_{2k+1,n} L_{2k+1,n}^A > 0 \\ |L_{2k+1,n}^A|, & \text{otherwise} \end{cases}$$

These examples visualize one possible realization of the metric contributions according to the separation idea in equation (17). Further different realizations are possible. Based on such a separation and independent from the actual realization of the contributing metrics, the metrics $e_{best}^{(n)}(s_n^{best})$ and $e^{(n)}(s_{l,n}^c)$ as well as their arguments can be computed much more efficiently:

$$e_{best}^{(n)}(s_n^{best}) = e_{best,Re}^{(n)}(s_{n,Re}^{best}) \oplus e_{best,Im}^{(n)}(s_{n,Im}^{best}) \quad (20)$$

$$e_{best,Re}^{(n)}(s_{n,Re}^{best}) = \widetilde{\min} \, e_{Re}^{(n)}(s_{n,Re})$$

$$e_{best,Im}^{(n)}(s_{n,Im}^{best}) = \widetilde{\min} \, e_{Im}^{(n)}(s_{n,Im})$$

where the operator $\widetilde{\min}$ is the suitable I/Q-component-wise operator for minimizing the overall metric, depending on the choice of $\oplus$. In the examples given above, it is simply the standard minimum operator "min". With the operators selected for the given example, $e_{best}^{(n)}$, its argument $s_n^{best}$ and the corresponding partial bit vector $b_{*,n}^{best} = \mu^{-1}(s_n^{best})$ can be determined jointly by computing only $$2^{\frac{L_n}{2}+1}$$

metrics $e_{best,Re}^{(n)}$ and $e_{best,Im}^{(n)}$, e.g. 16 (partial) metrics for a 64-QAM modulation, and performing two minimum searches among $$2^{\frac{L_n}{2}}$$

elements only, e.g. two min-of-8 searches for a 64-QAM modulation.

Similarly, the metrics $e^{(n)}(s_{l,n}^c)$ of the counter-hypothesis candidates $s_{l,n}^c$ can be efficiently computed based on the separation of in-phase and quadrature-phase metric contributions with $0 \leq k < L_n/2$:

$$e^{(n)}(s_{2k,n}^c) = e_{best,Im}^{(n)}(s_{n,Im}^{best}) \oplus \widetilde{\min} \{e_{Re}^{(n)}(s_{n,Re})\} \quad (21)$$

$$e^{(n)}(s_{2k+1,n}^c) = e_{best,Re}^{(n)}(s_{n,Re}^{best}) \oplus \widetilde{\min} \{e_{Im}^{(n)}(s_{n,Im})\}.$$

Overall, for computing all $L_n$ counter-hypothesis candidates and their metrics with the operators selected in the given examples, additional $L_n$ minimum searches among $$2^{\frac{L_n}{2}-1}$$

elements are required, e.g. six min-of-4 searches for a 64 QAM modulation.

Figure 4:
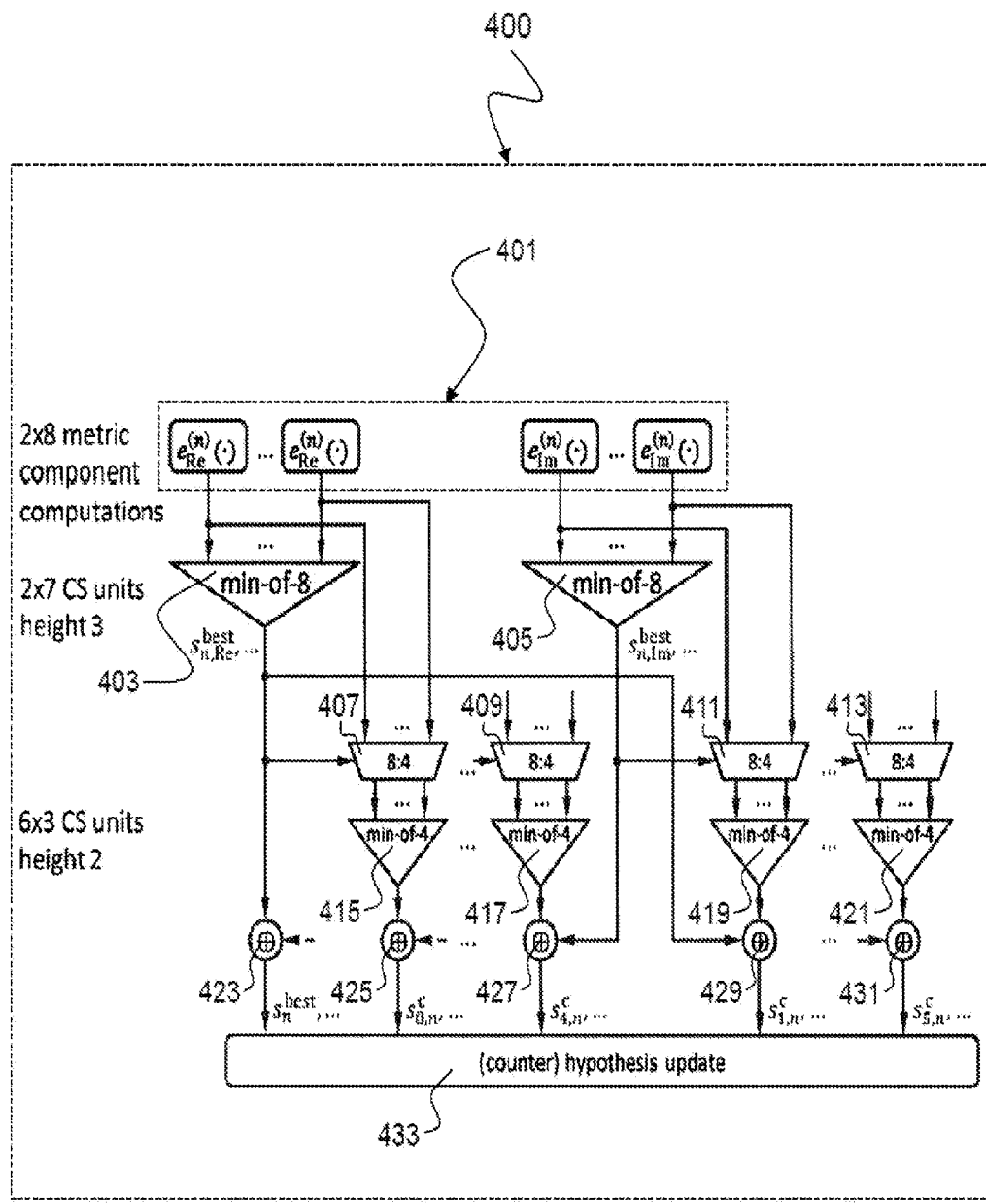
FIG. 4 is a schematic diagram of a device 400 in accordance with the disclosure for symbol detection.

As demonstrated with the examples above, this separation principle enables efficient computation of optimum counter-hypothesis nodes and metrics for a single spatial layer in SISO detectors. This is particularly useful in the context of FLLE. Furthermore, the critical control-flow paths of tree-search approaches are not affected by SISO FLLE. Therefore, it is well suited for architectural optimizations such as pipelining. An exemplary visualization with complexities for a 64-QAM modulation is depicted in FIG. 4 described below. By applying a priori based contributions and channel-based contributions in the metric, an inefficient "2D" search according to the brute-force approach described above with respect to equations (14) and (15) can be efficiently replaced by two efficient separate "1D" searches along the real and the imaginary symbol component axes. By applying these searches across real/imaginary part metric contributions, a priori information can be considered efficiently during the search for candidate symbols, other than for the non-SISO FLLE or the brute force SISO FLLE.

The methods and devices described herein may provide a significant complexity reduction of a MIMO detector component in an IDD system. Such detectors are often realized by algorithms called "sphere decoder". The methods and devices described herein are well suited for a very wide range of different such sphere decoding variants, but are not limited to.

The use of the SISO FLLE approach is well suited to tree-search approaches, but not limited to. Alternatively, the SISO FLLE approach as described above can be applied to the MMSE-PIC algorithm described above with respect to equation (13). The architecture published in "C. Studer, S. Fateh and D. Seethaler: A 757 Mb/s 1.5 mm 90 nm CMOS Soft-Input Soft-Output MIMO Detector for IEEE 802.11n, in IEEE Proceedings of the European Solid States Circuits Conference, pp. 530-533, September 2010" and in "C. Studer, S. Fateh, D. Seethaler: ASIC Implementation of Soft-Input Soft-Output MIMO Detection Using MMSE Parallel Interference Cancellation, in IEEE Journal of Solid-State Circuits, vol. 46, no. 7, pp. 1754-1765, July 2011" omits a priori information in the one-dimensional minimum search in equation (13) in order to apply well known optimizations for this minimum search. Therefore, the architecture benefits from a complexity reduction similar to that achievable by a non-SISO FLLE, but at the cost of a BLER (block error rate) performance degradation for higher modulation orders.

The SISO FLLE provides a solution to this problem. Therefore, the SISO FLLE can enable also the MMSE-PIC architecture described above to fully consider the a priori terms in its processing steps. This is achieved by using the metric contributions according to $$e_{A,Re}^{(n)}(s_{n,Re}) = \sum_{k=0}^{L_{n/2}-1} \frac{2b_{2k,n}-1}{2} L_{2k,n}^A \quad (22)$$

$$e_{A,Im}^{(n)}(s_{n,Im}) = \sum_{k=0}^{L_{n/2}-1} \frac{2b_{2k+1,n}-1}{2} L_{2k+1,n}^A$$

$$e_{C,Re}^{(n)}(s_{n,Re}) = \rho_n |\text{Re}\{z_n - s_n\}|^2$$

$$e_{C,Im}^{(n)}(s_{n,Im}) = \rho_n |\text{Im}\{z_n - s_n\}|^2$$

and simply defining the operators ⊞ and ⊕ as the scalar addition "+" operator as well as the operator ⊠ by the standard minimum "min" operator. The extrinsic output LLRs can then be simply computed by $$L_{l,n}^{L} = b_{l,n}^{best}(e^{(n)}(s_{l,n}^c) - e^{(n)}(s_n^{best})) - L_{l,n}^A. \quad (23)$$

The methods and devices described herein may be applied to any kind of sphere decoder. The methods and devices described herein maybe applied in base stations as well as in user equipment. The methods and devices described herein may be applied to interference cancelling, e.g. network assisted interference cancelling as defined in LTE Rel. 12, and to blind and non-blind interference cancelling. The methods and devices described herein may be applied to transmit diversity schemes where the information is spread across multiple antennas at the transmitter, e.g. Alamouti Space Time Block Coding (STBC) schemes. The methods and devices described herein may be applied to any kind of searching schemes with respect to Fast Leaf Level Enumeration schemes, in particular for improving the enumeration schemes with respect to search sequencing. The methods and devices described herein may be applied to hierarchical search trees, e.g. multiple 2×2 trees within one 4×4 tree. The methods and devices described herein may be applied to search trees including mixed modulation schemes, e.g. QAM modulation, e.g. 64-QAM, together with QPSK modulation. The trees may be constructed such that a priori information is distributed intelligently (e.g. according to its reliability) across the tree in order to reduce the search time.

The a priori information may be provided by any channel decoder or by any channel codec, e.g. by channel codec soft-output and/or soft information from a HARQ (hybrid automatic repeat request) mechanism. The a priori information may be provided by a joint source and channel coding scheme. The a priori information may be provided by exploiting any kind of a priori knowledge about the source and/or the channel, e.g. a non-uniform distribution of source bits or knowledge from pilot symbols.

In one example, the method 100 may include additively combining the contributions with respect to the channel-based information and the contributions with respect to a priori information. In one example of the method 100, the metric may include contributions with respect to an in-phase component and contributions with respect to a quadrature component of the particular candidate symbol. In one example, the method 100 may include using a metric according to an $L^p$ norm, in particular a Euclidean norm, a Manhattan norm or an infinity norm, or any power of any of norms. In one example, the method 100 may include combining the in-phase contributions and the quadrature contributions of the metric. In one example, the method 100 may include additively combining the in-phase contributions and the quadrature contributions or combining the in-phase contributions and the quadrature contributions with respect to a maximum criterion. In one example, the method 100 may include receiving the a priori information from a channel decoder. In one example, the method 100 may include receiving the symbol over a multiple-input multiple output communication system. In one example of the method 100, the assigning may include representing the particular symbol by a node of a search tree whose layers represent spatial streams of the multiple-input multiple output communication system. In one example of the method 100, the MIMO communication system includes one of the following schemes: single user MIMO, multi user MIMO, network assisted interference cancellation, blind interference cancellation and diversity schemes, in particular Alamouti diversity schemes. In one example, the method 100 may include using a complex constellation, in particular one of a QAM and a QPSK constellation, for forming the finite candidate symbol alphabet or the finite alphabet of its elements in case of a vector symbol. In one example of the method 100, the assigning may include determining the particular candidate symbol from the set of candidate symbols such that its metric is minimum with respect to an arbitrary sub-set of candidate symbols. In one example of the method 100, the a priori information may include a priori logarithmic likelihood ratios. In one example, the method 100 may include assigning soft information, in particular a logarithmic likelihood ratio, to the assigned received symbol based on the metric between the received symbol and the particular candidate symbol.

The FLLE approach can be efficiently applied to SISO MIMO demapping. By applying the method 100, FLLE can enable similarly significant complexity reductions for SISO detectors as known for non-SISO detectors. Using the method 100 the single-bit checks from non-SISO FLLE can be replaced by few metric computations and searches separated by real/imaginary part of the signal space. Therefore, the inefficient "2D" search in the complex plane is replaced by two efficient "1D" searches with either only real or only imaginary signal components. Without loss of optimality, a priori information can be properly considered. Therefore, this method 100 delivers the same optimum results as the brute-force search described above with respect to equations (14) and (15) but requires significantly less hardware resources or less processing time. The area-time complexity added that of the full detector by the two small "1D" searches along the real/imaginary axes is considered to be far lower than the complexity savings obtained from FLLE. Therefore, this method 100 is an efficient enabler of FLLE for SISO MIMO detectors.

FIG. 2 is a schematic diagram of a 64-QAM symbol modulation alphabet 200 in accordance with the disclosure used for providing a set of candidate symbols in a method 100 for symbol detection. The exemplary modulation alphabet 200 and the corresponding bit-to-symbol mapping are visualized for exemplary illustrating a method for symbol detection according to the realization as described above with respect to FIG. 1.

A symbol $\tilde{y}_n$ 202 may be received. The received symbol $\tilde{y}_n$ 202 may be located in between candidate symbols which are illustrated by the 64 points 201 of the exemplary 64-point constellation of the finite symbol alphabet 200. The received symbol $\tilde{y}_n$ 202 may be assigned to a particular candidate symbol 203 based on a metric between the received symbol $\tilde{y}_n$ 202 and the particular candidate symbol 203.

The metric with respect to the received symbol $\tilde{y}_n$ 202 and the particular candidate symbol 203 may be used to identify the hypothesis candidate. To prepare for soft-output computations a multiple number of counter-hypothesis candidates can be identified. In the constellation diagram 200, examples for such counter hypothesis candidates are symbols 205, 207, 209, 211, 213, 215. The counter-hypothesis candidates are determined by computing metrics with respect to the received symbol $\tilde{y}_n$ 202 and the other candidate symbols 205, 207, 209, 211, 213, 215. Minimum computations with respect to the determined metrics may provide the particular hypothesis and counter-hypothesis candidate symbols. Without a priori information and with a proper bit-to-symbol mapping, these minimum searches/decisions can be fully realized by constant expressions based on the geometric properties shown in FIG. 2 (non-SISO FLLE). With a priori information, these decisions cannot be realized based on the geometrical properties as visualized in FIG. 2. Instead, for an efficient solution the SISO FLLE approach shown with respect to FIGS. 4 and 5 can be applied.

Figure 3:
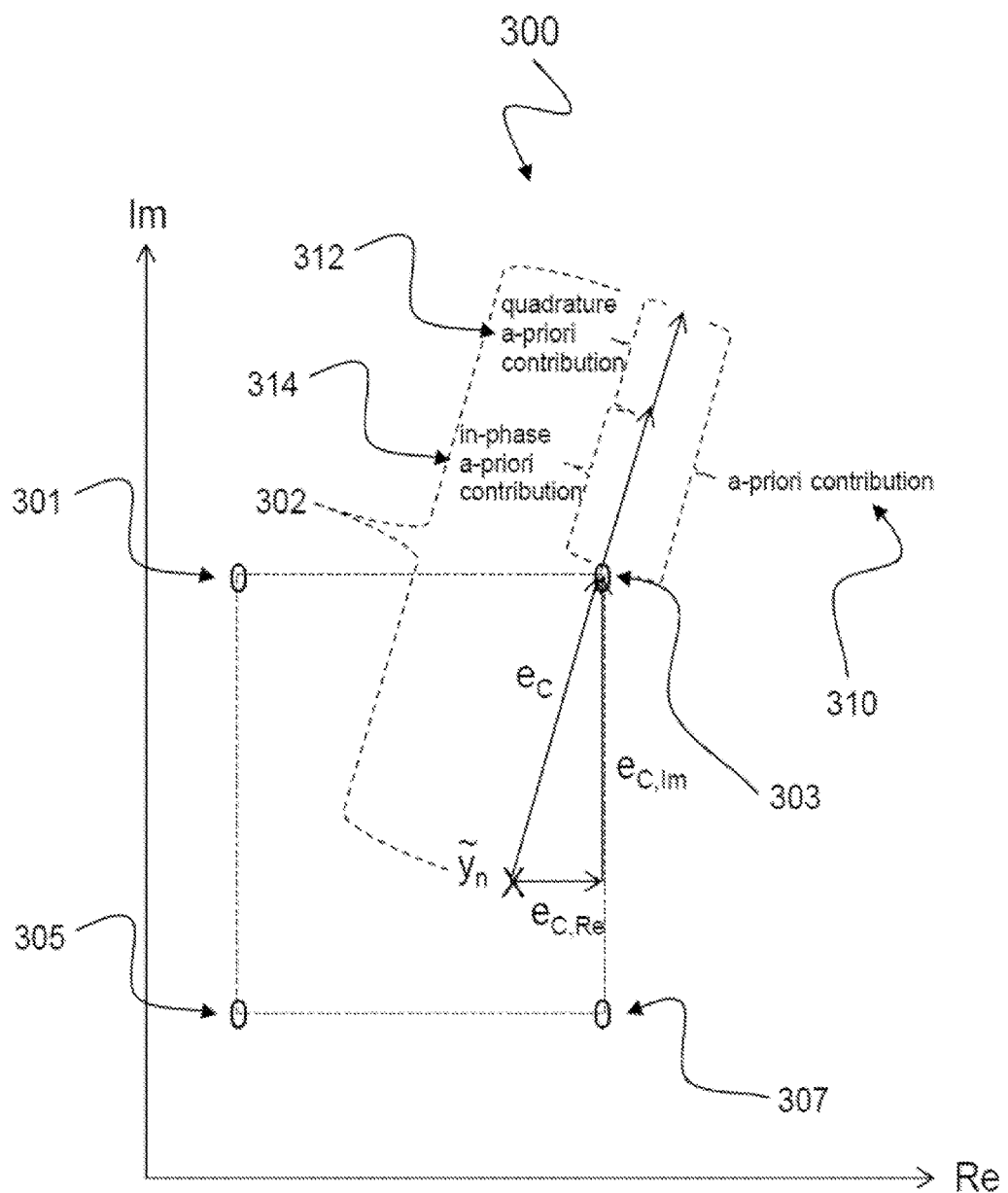
FIG. 3 is a constellation diagram 300 illustrating a metric 302 between a received symbol $\tilde{y}_n$ and a candidate symbol 303 of a finite candidate symbol alphabet 301, 303, 305, 307 in accordance with the disclosure.

FIG. 3 is a constellation diagram 300 illustrating a metric 302 between a received symbol $\tilde{y}_n$, e.g. a symbol $\tilde{y}_n$ received over a communication channel, and a candidate symbol 303 of a finite candidate symbol alphabet 301, 303, 305, 307 in accordance with the disclosure. The finite candidate symbol alphabet includes a first candidate symbol 301, a second candidate symbol 303, a third candidate symbol 305 and a fourth candidate symbol 307 which may represent a section of a larger constellation diagram, e.g. a 64-QAM constellation as described above with respect to FIG. 2.

The symbol detection as described in this document may provide a technique for assigning the received symbol $\tilde{y}_n$ to one of the candidate symbols 301, 303, 305, 307 of the candidate symbol alphabet based on a metric. The symbol $\tilde{y}_n$ may be received according to the first block 101 of the method 100 described above with respect to FIG. 1. The set of candidate symbols 301, 303, 305, 307 may be provided or received according to the first block 101 of the method 100 described above with respect to FIG. 1. The received symbol $\tilde{y}_n$ may be assigned to a particular candidate symbol of the symbol alphabet 301, 303, 305, 307 according to the first block 101 of the method 100 described above with respect to FIG. 1, i.e. based on a metric 302 including channel-based contributions $e_C$ and a priori based contributions 310, also denoted by $e_A$.

The channel-based contributions 320 (corresponding to $e_C$ with in-phase contribution 316 corresponding to $e_{C,Re}$ and quadrature contributions 318 corresponding to $e_{C,Im}$) are exemplarily depicted by the Euclidean norm between the received symbol $\tilde{y}_n$ and the second symbol 303. Instead of the Euclidean norm any other norm, e.g. 1-norm, infinity-norm or max-norm can be used for determining the channel-based contributions $e_C$. The Euclidean norm is exemplarily chosen here as the metric between symbol $\tilde{y}_n$ and second symbol 303 corresponds to the (squared) geometrical distance between the two points.

An auxiliary visualization of the a priori based contributions 310 is exemplarily depicted by the two arrows starting from the second symbol 303. As the a priori metric component may not be decomposed into a geometrical representation of perpendicular in-phase and quadrature components as for the channel-based information, in-phase component 314 and quadrature component 312 are visualized as pointing to the same direction in the constellation diagram 300 of FIG. 3. Please note that all linear distances shown in FIG. 3 are just auxiliary visualizations of metrics which may be realized in other domains as for example by squared Euclidian distances in (4).

The a priori based contributions 310 and the channel-based contributions $e_C$ of the metric (with auxiliary representation 302) may be determined according to equation (16) described above. The in-phase component $e_{C,Re}$ and the quadrature component $e_{C,Im}$ of the channel-based contribution $e_C$ of the metric (auxiliary visualization 302) and the in-phase component $e_{A,Re}$ (aux. vis. 314), and the quadrature component $e_{A,Im}$ (aux. vis. 312) of the a priori based contribution 310 of the metric (aux. vis. 302) may be determined according to one of the equations (16) to (22) as described above.

FIG. 4 is a schematic diagram of a device 400 in accordance with the disclosure for symbol detection. The symbol detection device 400 can be used for efficient SISO FLLE realization, complexities of the device units correspond to an exemplary 64-QAM modulation. Therefore, the number of blocks is matched to a 64-QAM symbol alphabet. When using other symbol alphabets, the structure of the symbol detection device 400 may stay the same, however a different number of units may be required.

The symbol detection device 400 includes a metric computation unit 401, e.g. corresponding to a metric computation unit 500 as described below with respect to FIG. 5. The metric computation unit 401 may compute in-phase contributions $e_{Re}^{(n)}(.)$ and quadrature phase contributions $e_{Im}^{(n)}(.)$, e.g. according to the equations (16) to (22) as described above. The eight in-phase contributions $e_{Re}^{(n)}(.)$ are provided to a first min-of-8 unit 403 configured to determine a minimum $s_{n,Re}^{best}$ of the eight in-phase contributions which serves as in-phase hypothesis. The eight quadrature phase contributions $e_{Im}^{(n)}(.)$ are provided to a second min-of-8 unit 405 configured to determine a minimum $s_{n,Im}^{best}$ of the eight quadrature phase contributions which serves as quadrature phase hypothesis.

The eight in-phase contributions $e_{Re}^{(n)}(.)$ are provided to three 8:4 multiplexer 407, 409 (only two are depicted in FIG. 4) followed by three min-of-4 units 415, 417 (only two are depicted in FIG. 4) which are configured to process a minimum detection providing three in-phase counter-hypotheses. The eight quadrature phase contributions $e_{Im}^{(n)}(.)$ are provided to three 8:4 multiplexer 411, 413 (only two are depicted in FIG. 4) followed by three min-of-4 units 419, 421 (only two are depicted in FIG. 4) which are configured to process a minimum detection providing three quadrature phase counter-hypotheses.

The in-phase hypothesis $s_{n,Re}^{best}$ is combined with the quadrature phase hypothesis $s_{n,Im}^{best}$ by using a first combiner 423 providing the hypothesis $s_n^{best}$. The three in-phase counter-hypotheses are combined with the quadrature phase hypothesis $s_{n,Im}^{best}$ by three combiners 425, 427 (only two are depicted in FIG. 4) providing the three counter-hypotheses $s_{0,n}^c, s_{2,n}^c, s_{4,n}^c$. The three quadrature phase counter-hypotheses are combined with the in-phase hypothesis $s_{n,Re}^{best}$ by three combiners 429, 431 (only two are depicted in FIG. 4) providing the three counter-hypotheses $s_{1,n}^c, s_{3,n}^c, s_{5,n}^c$. In a hypothesis and counter-hypotheses update unit 433, the hypothesis candidate $s_n^{best}$ and the six counter-hypotheses candidates $s_{0,n}^c, s_{2,n}^c, s_{4,n}^c, s_{1,n}^c, s_{3,n}^c, s_{5,n}^c$ are typically used to update the hypothesis as well as the counter-hypotheses during the overall detection process.

The combiners 423, 425, 427, 429, 431 may be configured to implement the operator $\oplus$ as described above with respect to equations (17) to (23) which may be realized by the scalar addition "+" operator.

Figure 5:
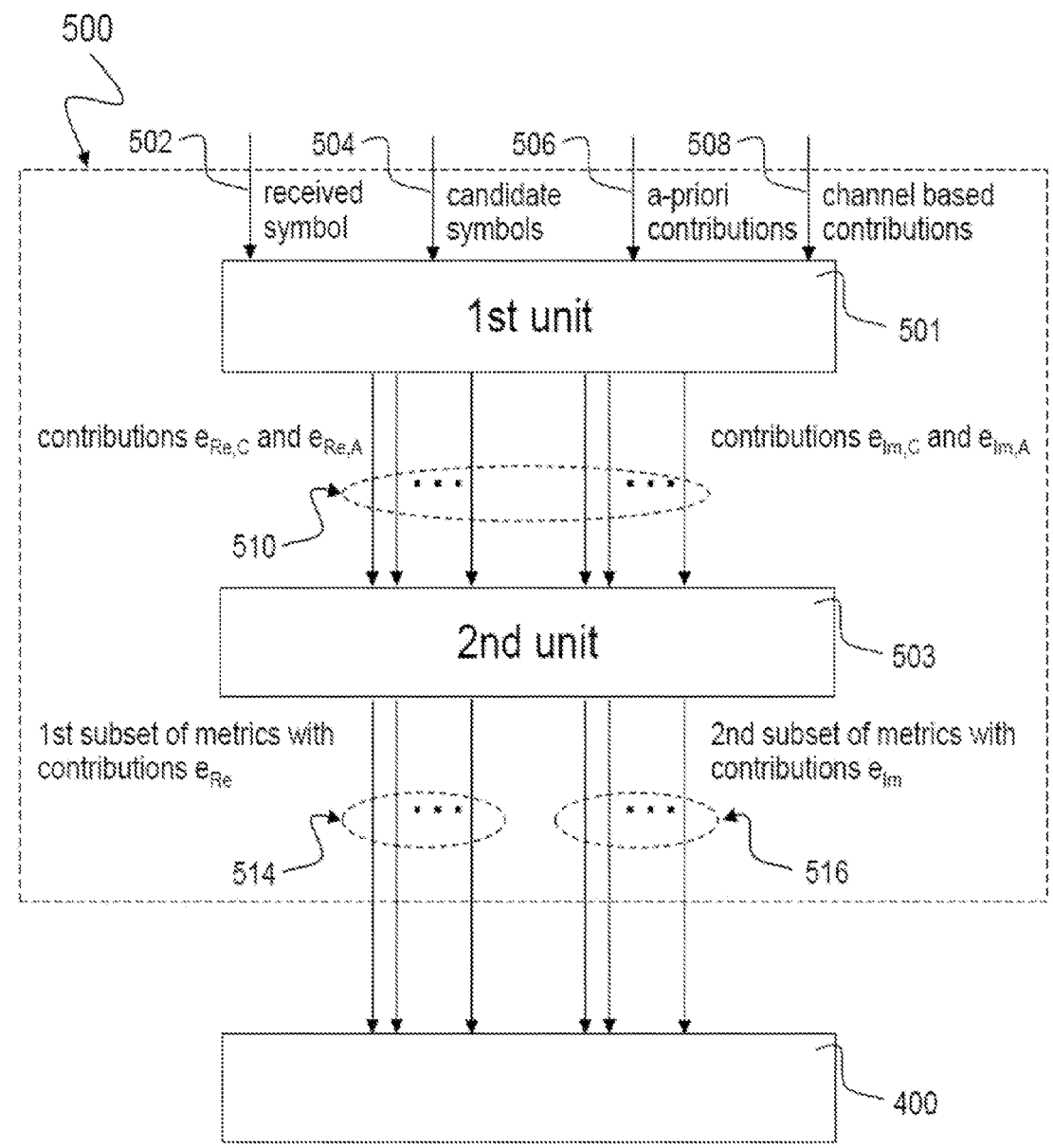
FIG. 5 is a schematic diagram of a device 500 in accordance with the disclosure for providing subsets of in-phase and quadrature based metrics with respect to a received symbol and candidate symbols of a finite candidate symbol alphabet.

FIG. 5 is a schematic diagram of a device 500 in accordance with the disclosure for providing subsets of in-phase and quadrature based metrics with respect to a received symbol and candidate symbols of a finite candidate symbol alphabet. The device 500 can also be referred to as metric computation unit and can be used with a symbol detection device 400 as described above with respect to FIG. 4.

The device 500 may include a first unit 501 configured to determine a set of metrics 510 between a received symbol 502 and candidate symbols 504 of a set of candidate symbols of a finite candidate symbol alphabet. The set of metrics 510 may include channel-based contributions 508 and a priori based contributions 506 with respect to in-phase contributions and with respect to quadrature phase contributions as described above with respect to FIGS. 1 to 4. The device 500 may include a second unit 503 configured to partition the set of metrics 510 into a first sub-set 514 including the contributions with respect to in-phase components of the candidate symbols and a second sub-set 516 including contributions with respect to quadrature components of the candidate symbols. The first sub-set 514 may include the in-phase contributions $e_{Re}^{(n)}(.)$ of the metrics as described above with respect to FIG. 4. The second sub-set 516 may include the quadrature phase contributions $e_{Im}^{(n)}(.)$ of the metrics as described above with respect to FIG. 4.

The first unit 501 and the second unit 503 are configured to determine the first 514 and second 516 sub-sets such that their both sizes, i.e. both, the size of the first sub-set 514 and the size of the second sub-set 516, are smaller or equal than a square root of a symbol number of the finite candidate symbol alphabet. When using the device 500 with the symbol detection device 400, for example, a number of eight in-phase metric contributions and eight quadrature phase metric contributions are provided for a 64-QAM symbol alphabet. This corresponds to a reduction of the two-dimensional search space to two one-dimensional searches. The square root thus denotes the reduction from two-dimensional space to one-dimensional space.

Figure 6:
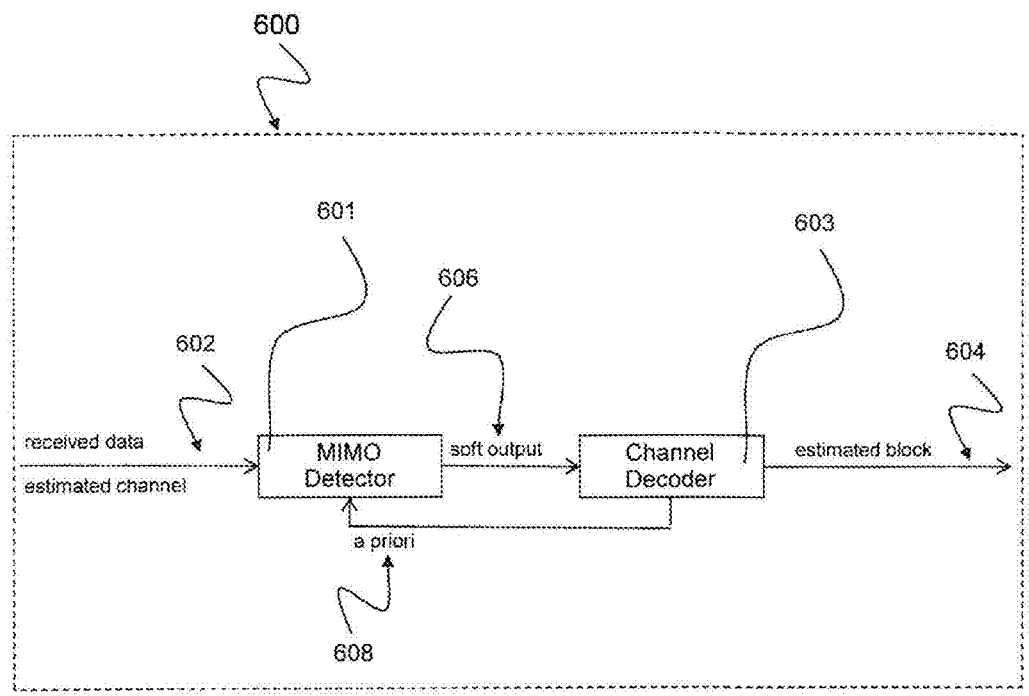
FIG. 6 is a schematic diagram of an iterative detection and decoding device 600 in accordance with the disclosure including a MIMO detector 601 and a channel decoder 603.

FIG. 6 is a schematic diagram of an iterative detection and decoding device 600 in accordance with the disclosure including a MIMO detector 601 and a channel decoder 603. The MIMO detector 601 may be a soft-input soft-output MIMO detector configured to compute soft-output information 606, for example extrinsic or a posteriori information, based on a metric between a channel observation and a candidate symbol of a finite symbol alphabet, wherein the metric includes contributions with respect to channel-based information and contributions with respect to a priori information 608. The metric may be computed as described above with respect to FIGS. 1 to 5. The channel decoder 603 may be a soft-input soft-output channel decoder configured to compute for example a posteriori or extrinsic information provided as a priori information 608 to the MIMO detector 601 based on the detector soft-output information 606. The iterative detection and decoding device 600 may provide an estimated block 604 based on received data and estimated channel observations 602.

The detector 601 takes channel observations 602 and a priori knowledge 608 and computes new soft-output information 606. Then the soft-output information 606 is provided to the channel decoder 603 which calculates soft-output information which is fed back as a priori knowledge 608 to the MIMO detector 601. This way of iterating between detector and decoder may reduce the bit error rate (BER) by this exchange of information compared with a single-pass detection-decoding step.

In one example, the MIMO detector 601 and the channel decoder 603 are configured to iteratively exchange the soft-output information 606 and the a priori information 608 as described above. In one example, the MIMO detector 601 is configured to compute the soft-output information 606 based on a tree search technique. In one example, the MIMO detector 601 includes a sphere decoder configured to compute the soft-output information 606. In one example, the MIMO detector 601 is configured to compute the soft-output information 606 based on a minimum mean-squared error algorithm, in particular based on a parallel interference cancellation algorithm, e.g. as described above with respect to equations (22) and (23). In one example, the MIMO detector 601 is configured to compute the soft-output information 606 based on a Markov Chain Monte Carlo (MCMC) algorithm.

In one example, the detector 601 or the decoder 603 may include a de-interleaver configured to de-interleave the detector soft-output information 606 before providing using it in the decoder 603. The detector 601 or the decoder 603 may include an interleaver configured to interleave the decoder soft-output information 608 provided to the detector 601.

In one example, the detector 601 may take channel observations 602 and a priori knowledge 608 on the inner coded bits and computes new soft-output information 606 for each of the coded bits per vector channel symbol. Then the a priori information 608 may be subtracted from the a posteriori information to become the extrinsic information used as a priori input to the outer soft-in/soft-out decoder 603 (e.g. using a MAP, APP or a BCJR algorithm) which may calculate soft-output information on the outer coded bits. Then the a priori information of the decoder 603 may be subtracted from the a posteriori information on the outer coded bits. The resulting extrinsic information may be fed back as a priori knowledge 608 to the inner detector 601. This way of iterating between detector and decoder may reduce the bit error rate (BER) by this exchange of information compared with a single-pass detection-decoding step.

Figure 7:
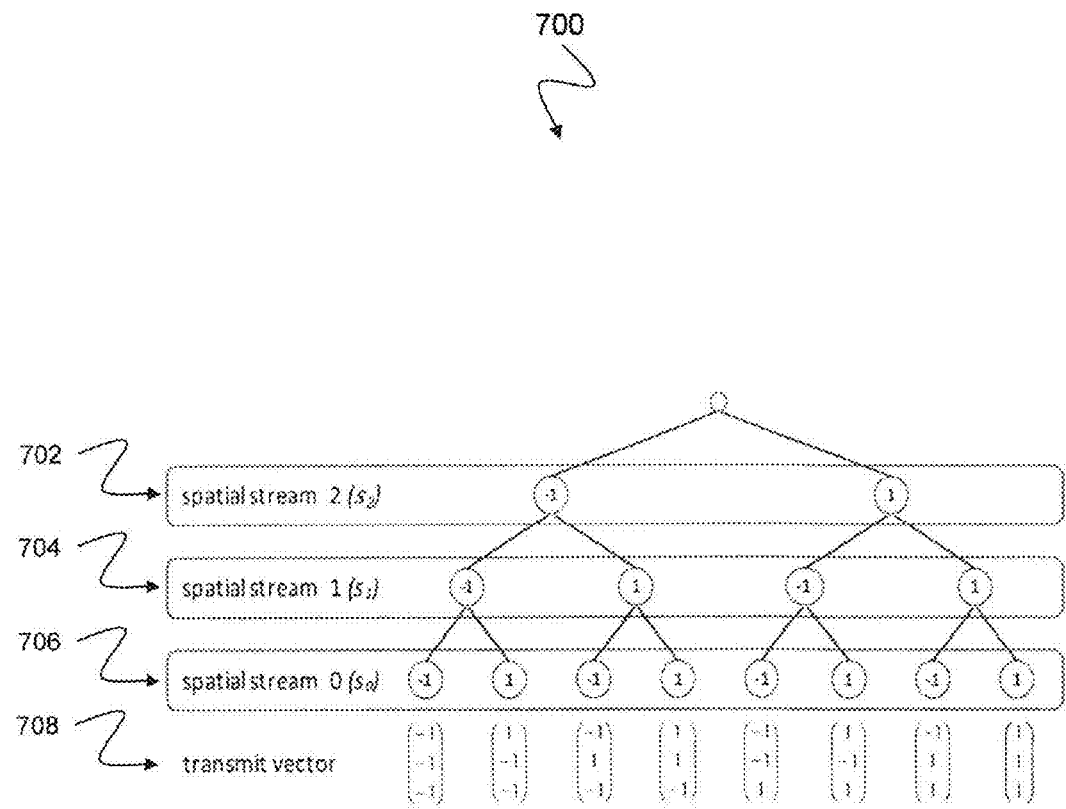
FIG. 7 is a schematic diagram of an exemplary search tree 700 realization in accordance with the disclosure.

FIG. 7 is a schematic diagram of an exemplary search tree 700 realization in accordance with the disclosure. The exemplary tree 700 includes three levels corresponding to N=3 spatial streams with a BPSK modulation $\hat{s}_n = \{-1, +1\}$ for the purpose of an exemplary simple visualization: Spatial stream i=2 702, spatial stream i=1 704 and spatial stream. i=0 706. The tree root "above" spatial stream 2 does not represent a spatial stream but can be interpreted as an empty partial vector. In this visualization, each path through the tree from the root to a leaf (spatial stream i=0) represents one transmit symbol vector candidate 808 such as $(-1, -1, -1)^T$; $(1, -1, -1)^T$; $(-1, 1, -1)^T$; $(1, 1, -1)^T$; $(-1, -1, 1)^T$; $(1, -1, 1)^T$; $(-1, 1, 1)^T$; $(1, 1, 1)^T$. Metrics $e^{(n)}$ can be annotated as branch metrics to the edges of the tree. Thus, the maximum-likelihood detection and the computation of the max-log LLRs can be transformed into a search in a weighted tree, which may be performed by any tree traversal approach. The path associated with the smallest metric $d^{(n)}$ according to (6) corresponds to the MAP solution $s^{MAP}$ with $\lambda^{MAP} = d(s^{MAP})$ according to (10) as described above. In order to compute soft-output LLRs, further paths through the tree (i.e. candidate transmit symbol vectors) need to be identified according to (7) and (8). Symbol detection in the search tree 700 may be performed by using the method 100 as described above with respect to FIG. 1. Symbol detection in the search tree 700 may be performed by using the devices 400, 500 as described above with respect to FIGS. 4 and 5.

The following examples pertain to further embodiments. Example 1 is a method for symbol detection, comprising: assigning a received symbol to at least one particular candidate symbol of a set of candidate symbols of a finite candidate symbol alphabet based on metrics between the received symbol and the at least one particular candidate symbol, the metrics comprising contributions with respect to channel-based information and contributions with respect to a priori information. In Example 2, the subject matter of Example 1 can optionally include separating and combining the metrics contributions with respect to the channel-based information and the metrics contributions with respect to a priori information. In Example 3, the subject matter of anyone of Examples 1-2 can optionally include: the metrics comprising separating and combining contributions with respect to an in-phase component and contributions with respect to a quadrature component. In Example 4, the subject matter of any one of Examples 1-3 can optionally include: using metrics according to a norm; and combining the in-phase contributions and the quadrature contributions of such metrics. In Example 5, the subject matter of any one of Examples 1-4 can optionally include: receiving the a priori information, in particular from a channel decoder or any other source prior information. In Example 6, the subject matter of anyone of Examples 1-5 can optionally include: receiving the symbol over a multiple-input multiple output communication system. In Example 7, the subject matter of any one of Examples 1-6 can optionally include: representing the particular symbol by a node of a search tree or a path through multiple nodes of a search tree whose layers represent streams of a multiple-input multiple output communication system. In Example 8, the subject matter of any one of Examples 1-7 can optionally include: the multiple-input multiple output communication system comprises one of the following schemes: single-user MIMO, multi-user MIMO, network-assisted interference cancellation, blind interference cancellation, and diversity schemes. In Example 9, the subject matter of any one of Examples 1-8 can optionally include: using a complex constellation or vectors thereof, for forming a finite candidate symbol alphabet. In Example 10, the subject matter of any one of Examples 1-9 can optionally include: determining the at least one particular candidate symbol from the set of candidate symbols such that its metric is minimum with respect to an arbitrary set of candidate symbols. In Example 11, the subject matter of any one of Examples 1-10 can optionally include: the a priori information comprising a priori logarithmic likelihood ratios. In Example 12, the subject matter of any one of Examples 1-11 can optionally include: assigning soft information to the received symbol based on the metrics between the received symbol and the at least one particular candidate symbol.

Example 13 is a device for symbol detection, comprising a first unit configured to determine a set of metrics between a received symbol and candidate symbols of a set of candidate symbols of a finite candidate symbol alphabet, the set of metrics comprising channel-based contributions and a priori based contributions with respect to in-phase and quadrature components of the candidate symbols; and a second unit configured to partition the set of metrics into a first sub-set comprising contributions with respect to the in-phase components of the candidate symbols and a second sub-set comprising contributions with respect to the quadrature components of the candidate symbols. In Example 14, the subject matter of Example 13 can optionally include: the first unit is configured to determine the first and second sub-sets such that both their sizes are smaller or equal than a square root of a symbol number of a finite candidate symbol alphabet. In Example 15, the subject matter of any one of Examples 13-14 can optionally include a third unit configured to determine a first hypothesis based on the first sub-set of metrics; a fourth unit configured to determine a second hypothesis based on the second sub-set of metrics; a fifth unit configured to determine at least one first counter-hypothesis based on the first sub-set of metrics; a sixth unit configured to determine at least one second counter-hypothesis based on the second sub-set of metrics; a seventh unit configured to compute a result based on the first and second hypothesis and based on the at least one first and the at least one second counter-hypotheses.

Example 16 is a device, comprising: a soft-input soft-output MIMO detector configured to compute soft-output information based on a metric between a channel observation and a candidate symbol of a finite symbol alphabet, the metric comprising contributions with respect to channel-based information and contributions with respect to a priori information; and a soft-input soft-output channel decoder configured to provide the a priori information to the MIMO detector based on the soft-output information. In Example 17, the subject matter of Example 16 can optionally include: the MIMO detector and the channel decoder are configured to iteratively exchange the detector soft-output information and decoder soft-output information. In Example 18, the subject matter of any one of Examples 16-17 can optionally include: the MIMO detector is configured to compute the soft-output information based on a tree search technique. In Example 19, the subject matter of any one of Examples 16-18 can optionally include: the MIMO detector comprises a sphere decoder configured to compute the soft-output information. In Example 20, the subject matter of any one of Examples 16-19 can optionally include: the MIMO detector is configured to compute the soft-output information based on any other kind of algorithm, in particular a minimum mean-squared error algorithm or a Markov Chain Monte Carlo algorithm.

In Example 21, the subject matter of any one of Examples 1-15 can optionally include: using metrics according to an $L^p$-norm; and combining the in-phase contributions and the quadrature contributions of such metrics. In Example 22, the subject matter of any one of Examples 1-15 and 21 can optionally include: using metrics according to one of a Manhattan norm, a Euclidean norm and an infinity norm; or powers thereof; and combining the in-phase contributions and the quadrature contributions of such metrics. In Example 23, the subject matter of any one of Examples 1-15 and 21-22 can optionally include: the multiple-input multiple output communication system comprises one of the following schemes: single-user MIMO, multi-user MIMO, network-assisted interference cancellation, blind interference cancellation, and Alamouti schemes. In Example 24, the subject matter of any one of Examples 1-15 and 21-23 can optionally include: using one of a QAM, a QPSK and a BPSK constellation, or vectors thereof, for forming a finite candidate symbol alphabet. In Example 25, the subject matter of any one of Examples 1-15 and 21-24 can optionally include: assigning logarithmic likelihood ratios to the received symbol based on the metrics between the received symbol and the at least one particular candidate symbol.

Example 26 is a computer readable medium on which computer instructions are stored which when executed by a computer, cause the computer to perform the method of any one of Examples 1 to 15 and 21-25.

Example 27 is a symbol detector, comprising: an assigning unit configured to assign a received symbol to at least one particular candidate symbol of a set of candidate symbols of a finite candidate symbol alphabet based on metrics between the received symbol and the at least one particular candidate symbol, the metrics comprising contributions with respect to channel-based information and contributions with respect to a priori information. In Example 28, the subject matter of Example 27 can optionally include: the assigning unit is configured to separate and combine the metrics contributions with respect to the channel-based information and the metrics contributions with respect to a priori information. In Example 29, the subject matter of any one of Examples 27-28 can optionally include: the assigning unit is configured to provide the metrics comprising separating and combining contributions with respect to an in-phase component and contributions with respect to a quadrature component. In Example 30, the subject matter of any one of Examples 27-29 can optionally include: the assigning unit is configured to provide use metrics according to a norm; and to combine the in-phase contributions and the quadrature contributions of such metrics. In Example 31, the subject matter of any one of Examples 27-30 can optionally include: a receiving unit configured to receive the a priori information. In Example 32, the subject matter of any one of Examples 27-31 can optionally include: the receiving unit is configured to receive the a priori information from a channel decoder or any other source prior information. In Example 33, the subject matter of any one of Examples 27-32 can optionally include: the receiving unit is configured to receive the symbol over a multiple-input multiple output communication system. In Example 34, the subject matter of any one of Examples 27-33 can optionally include: the assigning unit is configured to represent the particular symbol by a node of a search tree or a path through multiple nodes of a search tree whose layers represent streams of a multiple-input multiple output communication system. In Example 35, the subject matter of any one of Examples 27-34 can optionally include: the multiple-input multiple output communication system comprises one of the following schemes: single-user MIMO, multi-user MIMO, network-assisted interference cancellation, blind interference cancellation, and diversity schemes. In Example 36, the subject matter of any one of Examples 27-35 can optionally include: the multiple-input multiple output communication system comprises one of the following schemes: single-user MIMO, multi-user MIMO, network-assisted interference cancellation, blind interference cancellation, and Alamouti schemes. In Example 37, the subject matter of any one of Examples 27-36 can optionally include: the assigning unit is configured to use a complex constellation or vectors thereof, for forming a finite candidate symbol alphabet. In Example 38, the subject matter of any one of Examples 27-37 can optionally include: the assigning unit is configured to determine the at least one particular candidate symbol from the set of candidate symbols such that its metric is minimum with respect to an arbitrary set of candidate symbols. In Example 39, the subject matter of any one of Examples 27-38 can optionally include: the a priori information comprises a priori logarithmic likelihood ratios. In Example 40, the subject matter of any one of Examples 27-39 can optionally include: the assigning unit is configured to assign soft information to the received symbol based on the metrics between the received symbol and the at least one particular candidate symbol.

Example 41 is a symbol detector, comprising: assigning means for assigning a received symbol to at least one particular candidate symbol of a set of candidate symbols of a finite candidate symbol alphabet based on metrics between the received symbol and the at least one particular candidate symbol, the metrics comprising contributions with respect to channel-based information and contributions with respect to a priori information. In Example 42, the subject matter of Example 41 can optionally include: the assigning means is configured to separate and combine the metrics contributions with respect to the channel-based information and the metrics contributions with respect to a priori information. In Example 43, the subject matter of any one of Examples 41-42 can optionally include: the assigning means is configured to provide the metrics comprising separating and combining contributions with respect to an in-phase component and contributions with respect to a quadrature component. In Example 44, the subject matter of any one of Examples 41-43 can optionally include: the assigning means is configured to provide use metrics according to a norm; and to combine the in-phase contributions and the quadrature contributions of such metrics. In Example 45, the subject matter of any one of Examples 41-44 can optionally include: receiving means for receiving the a priori information. In Example 46, the subject matter of any one of Examples 41-45 can optionally include: the receiving means is configured to receive the a priori information from a channel decoder or any other source prior information. In Example 47, the subject matter of any one of Examples 41-46 can optionally include: the receiving means is configured to receive the symbol over a multiple-input multiple output communication system. In Example 48, the subject matter of any one of Examples 41-47 can optionally include: the assigning means is configured to represent the particular symbol by a node of a search tree or a path through multiple nodes of a search tree whose layers represent streams of a multiple-input multiple output communication system. In Example 49, the subject matter of any one of Examples 41-48 can optionally include: the multiple-input multiple output communication system comprises one of the following schemes: single-user MIMO, multi-user MIMO, network-assisted interference cancellation, blind interference cancellation, and diversity schemes. In Example 50, the subject matter of any one of Examples 41-49 can optionally include: the assigning means is configured to use a complex constellation or vectors thereof, for forming a finite candidate symbol alphabet. In Example 51, the subject matter of any one of Examples 41-50 can optionally include: the assigning means is configured to determine the at least one particular candidate symbol from the set of candidate symbols such that its metric is minimum with respect to an arbitrary set of candidate symbols. In Example 52, the subject matter of any one of Examples 41-51 can optionally include: the a priori information comprises a priori logarithmic likelihood ratios. In Example 53, the subject matter of any one of Examples 41-52 can optionally include: the assigning means is configured to assign soft information to the received symbol based on the metrics between the received symbol and the at least one particular candidate symbol.

Example 54 is a device for symbol detection, comprising determining means for determining a set of metrics between a received symbol and candidate symbols of a set of candidate symbols of a finite candidate symbol alphabet, the set of metrics comprising channel-based contributions and a-priori based contributions with respect to in-phase and quadrature components of the candidate symbols; and partitioning means for partitioning the set of metrics into a first sub-set comprising contributions with respect to the in-phase components of the candidate symbols and a second sub-set comprising contributions with respect to the quadrature components of the candidate symbols. In Example 55, the subject matter of Example 54 can optionally include: the determining means being configured to determine the first and second sub-sets such that their both sizes are smaller or equal than a square root of a symbol number of the finite candidate symbol alphabet. In Example 56, the subject matter of any one of Examples 54-55 can optionally include: second determining means for determining a first hypothesis based on the first sub-set of metrics; third determining means for determining a second hypothesis based on the second sub-set of metrics; fourth determining means for determining at least one first counter-hypothesis based on the first sub-set of metrics; fifth determining means for determining at least one second counter-hypothesis based on the second sub-set of metrics; computing means for computing a result based on the first and second hypothesis and based on the at least one first and the at least one second counter-hypotheses.

Example 57 is a device, comprising: computing means for computing soft-output information based on a metric between a channel observation and a candidate symbol of a finite symbol alphabet, the metric comprising contributions with respect to channel-based information and contributions with respect to a-priori information; and providing means for providing the a-priori information to the computing means based on the soft-output information. In Example 58, the subject matter of Example 57 can optionally include: the computing means and the providing means are configured to iteratively exchange the soft-output information and the a-priori information. In Example 59, the subject matter of any one of Examples 57-58 can optionally include: the computing means is configured to compute the soft-output information based on a tree search technique. In Example 60, the subject matter of any one of Examples 57-59 can optionally include: the computing means comprises sphere decoding means for computing the soft-output information by applying a sphere decoding algorithm. In Example 61, the subject matter of any one of Examples 57-60 can optionally include: the computing means is configured to compute the soft-output information based on a minimum mean-squared error algorithm or based on a Markov Chain Monte Carlo algorithm.

Example 62 is a system, comprising: a soft-input soft-output MIMO detector configured to compute soft-output information based on a metric between a channel observation and a candidate symbol of a finite symbol alphabet, the metric comprising contributions with respect to channel-based information and contributions with respect to a-priori information; and a soft-input soft-output channel decoder configured to provide the a-priori information to the MIMO detector based on the soft-output information. In Example 63, the subject matter of Example 62 can optionally include: the MIMO detector and the channel decoder are configured to iteratively exchange the soft-output information and the a-priori information. In Example 64, the subject matter of any one of Examples 62-63 can optionally include: the MIMO detector is configured to compute the soft-output information based on a tree search technique. In Example 65, the subject matter of any one of Examples 62-64 can optionally include: the MIMO detector comprises a sphere decoder configured to compute the soft-output information. In Example 66, the subject matter of any one of Examples 62-65 can optionally include: the MIMO detector is configured to compute the soft-output information based on a minimum mean-squared error algorithm or based on a Markov Chain Monte Carlo algorithm.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A method for symbol detection, comprising:
   assigning a received symbol to at least one particular candidate symbol of a set of candidate symbols of a finite candidate symbol alphabet based on a set of metrics between the received symbol and the at least one particular candidate symbol, the set of metrics comprising contributions with respect to channel-based information and contributions with respect to a priori information;
   partitioning the set of metrics into a first sub-set of metrics comprising contributions with respect to the in-phase components of the candidate symbols and a second sub-set comprising contributions with respect to the quadrature components of the candidate symbols;
   determining a first hypothesis based on the first sub-set of metrics;
   determining a second hypothesis based on the second sub-set of metrics;
   determining at least one first counter-hypothesis based on the first sub-set of metrics;
   determining at least one second counter-hypothesis based on the second sub-set of metrics; and
   computing a result based on the first and second hypothesis and based on the at least one first and the at least one second counter-hypotheses.

2. The method of claim 1, comprising:
   separating and combining the metrics contributions with respect to the channel-based information and the contributions with respect to a priori information.

3. The method of claim 1, comprising:
   using metrics according to one of a Manhattan norm, a Euclidean norm and an infinity norm, or powers thereof; and
   combining the in-phase contributions and the quadrature contributions of such metrics.

4. The method of claim 1, comprising:
   receiving the a priori information from a channel decoder or any other source prior information.

5. The method of claim 1, comprising:
   receiving the symbol over a multiple-input multiple output communication system.

6. The method of claim 5, comprising:
   representing the particular symbol by a node of a search tree or a path through multiple nodes of a search tree whose layers represent streams of a multiple-input multiple output communication system.

7. The method of claim 6, wherein the multiple-input multiple output communication system comprises one of the following schemes:
   single-user MIMO,
   multi-user MIMO,
   network-assisted interference cancellation,
   blind interference cancellation, and
   Alamouti schemes.

8. The method of claim 1, comprising:
using one of a QAM, a QPSK and a BPSK constellation, or vectors thereof, for forming a finite candidate symbol alphabet.

9. The method of claim 1, comprising:
determining the at least one particular candidate symbol from the set of candidate symbols such that its metric is minimum with respect to an arbitrary set of candidate symbols.

10. The method of claim 1, wherein the a priori information comprises a priori logarithmic likelihood ratios.

11. The method of claim 1, comprising:
assigning logarithmic likelihood ratios to the received symbol based on the metrics between the received symbol and the at least one particular candidate symbol.

12. A device for symbol detection, comprising:
a first circuit configured to determine a set of metrics between a received symbol and candidate symbols of a set of candidate symbols of a finite candidate symbol alphabet, the set of metrics comprising channel-based contributions and a priori based contributions with respect to in-phase and quadrature components of the candidate symbols;
a second circuit configured to partition the set of metrics into a first sub-set comprising contributions with respect to the in-phase components of the candidate symbols and a second sub-set comprising contributions with respect to the quadrature components of the candidate symbols;
a third circuit configured to determine a first hypothesis based on the first sub-set of metrics;
a fourth circuit configured to determine a second hypothesis based on the second sub-set of metrics;
a fifth circuit configured to determine at least one first counter-hypothesis based on the first sub-set of metrics;
a sixth circuit configured to determine at least one second counter-hypothesis based on the second sub-set of metrics; and
a seventh circuit configured to compute a result based on the first and second hypothesis and based on the at least one first and the at least one second counter-hypotheses.

13. The device of claim 12, wherein the first circuit is configured to determine the first and second sub-sets such that both their sizes are smaller or equal than a square root of a symbol number of a finite candidate symbol alphabet.

14. A device, comprising:
a soft-input soft-output MIMO detector configured to compute soft-output information based on a metric between a channel observation and a candidate symbol of a finite symbol alphabet, the metric comprising contributions with respect to channel-based information and contributions with respect to a priori information;
a soft-input soft-output channel decoder configured to provide the a priori information to the MIMO detector based on the soft-output information; and
a circuit configured to:
partition the metric into a first set of metrics comprising contributions with respect to the in-phase components of the candidate symbols and a second set comprising contributions with respect to the quadrature components of the candidate symbols;
determine a first hypothesis based on the first set of metrics;
determine a second hypothesis based on the second set of metrics;
determine at least one first counter-hypothesis based on the first set of metrics;
determine at least one second counter-hypothesis based on the second set of metrics; and
compute a result based on the first and second hypothesis and based on the at least one first and the at least one second counter-hypotheses.

15. The device of claim 14, wherein the MIMO detector and the channel decoder are configured to iteratively exchange the detector soft-output information and decoder soft-output information.

16. The device of claim 14, wherein the MIMO detector is configured to compute the soft-output information based on a tree search technique.

17. The device of claim 14, wherein the MIMO detector comprises a sphere decoder configured to compute the soft-output information.

18. The device of claim 14, wherein the MIMO detector is configured to compute the soft-output information based on a minimum mean-squared error algorithm or a Markov Chain Monte Carlo algorithm.

* * * * *